(12) United States Patent
Gierling et al.

(10) Patent No.: US 6,236,925 B1
(45) Date of Patent: May 22, 2001

(54) METHOD FOR INCREASING THE DRIVING COMFORT OF VEHICLES

(75) Inventors: Armin Gierling, Langenargen; Hans-Dieter Hengstler, Ravensburg, both of (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 09/366,907

(22) Filed: Aug. 4, 1999

(30) Foreign Application Priority Data

Oct. 1, 1998 (DE) .............................. 198 45 167

(51) Int. Cl.[7] ....................................................... G06F 7/00
(52) U.S. Cl. ................................ 701/53; 701/51; 701/54; 701/58; 477/107; 477/110
(58) Field of Search .................................. 701/51, 53, 54, 701/58; 477/42, 43, 103, 110, 125, 78, 48, 49, 111, 114, 107

(56) References Cited

U.S. PATENT DOCUMENTS

| 4,507,986 | * | 4/1985 | Okamura et al. ....................... 477/43 |
| 5,364,321 | * | 11/1994 | Togai et al. .............................. 477/42 |
| 5,383,824 | * | 1/1995 | Runge et al. .......................... 477/110 |
| 5,433,676 | * | 7/1995 | Abe et al. .............................. 477/109 |
| 5,722,362 | * | 3/1998 | Takano et al. ........................ 123/295 |
| 5,938,712 | * | 8/1999 | Ibamoto et al. ........................ 701/54 |

FOREIGN PATENT DOCUMENTS

| 29 35 916 C2 | 4/1981 | (DE) . |
| 40 37 092 A1 | 5/1992 | (DE) . |
| 38 30 938 C2 | 11/1992 | (DE) . |
| 29 35 916 C3 | 12/1994 | (DE) . |
| 94/05934 | 3/1994 | (WO) . |

* cited by examiner

*Primary Examiner*—Jacques H. Louis-Jacques
(74) *Attorney, Agent, or Firm*—Davis & Bujold, P.L.L.C.

(57) ABSTRACT

The method for increasing the driving comfort of motor vehicles, specially during load reversal operations, by control of the dynamics of the driver's desired torque consists in that to a first microprocessor (1) signals are fed relative to the accelerator pedal position and rotational speed of the internal combustion engine, after which the output signal originating from the first microprocessor (1), together with a manually adjustable torque request signal, are fed to a second microprocessor (2), the output signal of which passes through a filter (5) as driver's desired torque, wherein the filtering time produces a damping of load reversal and jolt between driver's wish and internal engine speed ratio. The output signal of the filter (5), together with other control signals, are fed to a third microprocessor (3), the output signal of which, together with a torque-limiting signal originating from the transmission electronics, are fed to a fourth microprocessor (4) which produces the output signal for the throttle valve angle, the firing angle and the injection pulse width. The dynamics of the driver's desired torque are controlled by the electronic transmission control so that the transmission specific constants and/or operating-point dependent signals originating therefrom are fed to a second filter (6) the output signals of which are fed to the engine control and processed thereby.

6 Claims, 2 Drawing Sheets

METHOD FOR INCREASING THE DRIVING COMFORT OF VEHICLES

The invention relates to a method for increasing the driving comfort of motor vehicles, especially in load reversal operations, by controlling the dynamics of the driver's desired torque.

In motor vehicles having automatic transmission, there appear in certain situations, such as in positive and negative load reversals, jolts that impair the comfort. To prevent such jolts during the gear shifting operation of the automatic transmission, it has already been proposed in DE-C 29 35 916 that the torque of the internal combustion engine is reduced during the gear shift. Together with the reduction of the jolts when shifting, it is possible by the reduced torque of the internal combustion engine during the gear shift, also to reduce the slip time of the friction clutches of the automatic transmission that take part in the gear shift so that less heating and less wear of the friction elements occur. The control electronics for the internal combustion engine is equipped with a recognition control system which receives a switch signal from the transmission control during the gear shift. In a memory of the control device for the internal combustion engine, characteristic fields are deposited according to which the firing angle and/or the injection pulse width are controlled, depending on load and rotational speed. If a switch signal is fed to the recognition control system of the control electronics of the internal combustion engine, the control device shifts automatically to another characteristic field in which, by adjusting the firing angle in "late" direction or reduction of the injected amount of fuel, the torque of the internal combustion engine is reduced.

The exact determination of the moment of reduction of the torque already poses problems. Besides, such storing of different characteristic fields and a change of characteristic fields are relatively expensive.

DE-A 40 37 092 describes a method for control of the torque of an internal combustion engine which is combined with an automatic transmission driven by the internal combustion engine. Associated with the internal combustion engine is a control electronic system which controls the firing angle of the ignition system and/or the injection pulse width of the fuel injection system on the basis of rotational speed, load and, if needed, temperature signals. The transmission electronics associated with the automatic transmission controls for its part switching operations of the automatic transmission on the basis of rotational speed and load request signals.

To improve the control of the whole driving unit for the purpose of achieving jolt-free gear shifts, computer systems of the transmission control electronics and of the electronics of the internal combustion engine are steadily in communication with each other via interfaces wherein the control electronics of the internal combustion engine is fed from the transmission electronics in a cycle time beat and a percentage torque request on the basis of which the control device automatically controls the torque of the internal combustion engine.

A central microprocessor system is used for said purpose in which the individual microprocessors of the control electronics of the internal combustion engine and of the transmission electronics exchange data via serial or parallel interfaces. Via the interfaces, the actual data of the transmission electronics and corresponding requests are continually relayed to the control electronics for the internal combustion engine, which for its part can be thereby adapted to the transmission electronics. Thereby the transmission electronics can, at any time, transmit to the control electronics of the internal combustion engine, in the cyclic time, bear a desired reduction or increase with the aid of percent values.

SUMMARY OF THE INVENTION

Another possibility is to associate with the engine electronics so called comfort filters as dampers of load reversal and jolts.

The problem to be solved by the invention is to provide a method by which the dynamics of the driver's desired torque is controlled in a manner such that the comfort can still be further increased.

Departing from a method of the kind above described in detail, the problem is solved with the feature stated in the characteristic part of claim 1; advantageous developments are described in the subclaims.

For the whole KFZ system, it constitutes a considerable improvement in comfort that the dynamics of the driver's desired torque be controlled in certain situations by the transmission electronics. This is particularly advantageous in jerky accelerator pedal changes, i.e. during positive and negative load reversals. In connection with a CVT transmission, the physically predetermined limits of the flow rate/pressure balance and the hydraulic dead time of the pressure buildup in the contact and ratio adjusting system can be taken into account as needed and harmful variator slip be effectively prevented. In relation to continuously variable automatic transmissions, the comfort, e.g. in gear shift operations where the driver gives gas during the gear shift cycle, can be improved by taking into account as needed the hydraulic cycles during the change of gear.

BRIEF DESCRIPTION OF THE DRAWINGS

The invention is explained in more detail herebelow with reference to the drawings where two advantageous embodiments are shown. In the drawings.

DESCRIPTION OF THE PREFERRED EMBODIMENTS

Figure 1:
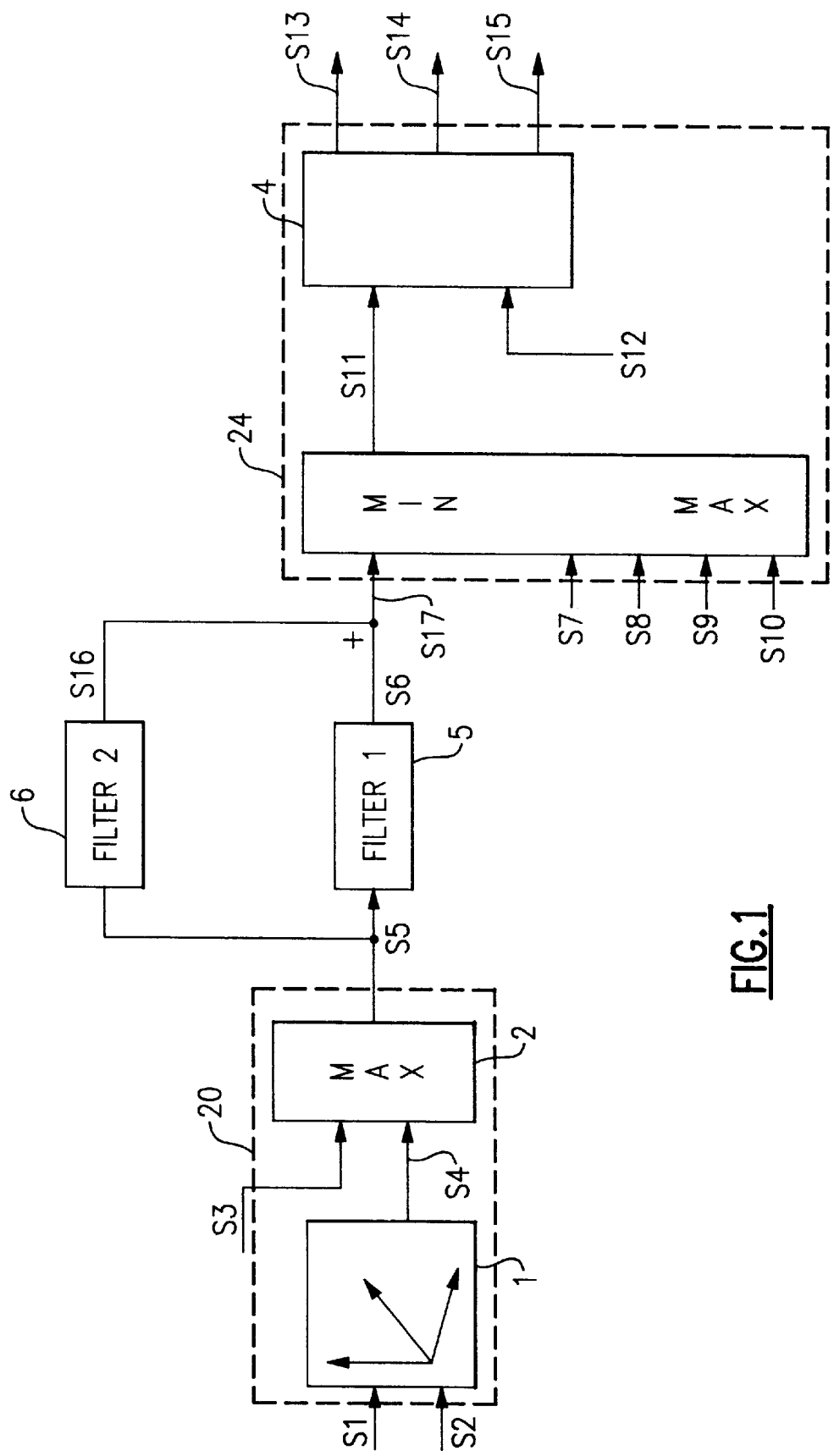
FIG. 1 is a gear shift circuit in which the engine control selects the filtering time according to the maximum method.

In the figures, where the same reference numbers have been given to the same parts and the same signals, 1 means a first microprocessor to which are fed signals S1, S2 relative to the accelerator pedal position and the rotational speed of the internal combustion engine. The output signal S4 of the first microprocessor 1 constitutes the accelerator pedal desired torque corresponding to the actual driving state and is fed, together with a manually adjustable torque request signal S3 (so-called tempomat), to a second microprocessor 2. The latter's output signal S5 is the driver's desired torque and passes through a filter 5 wherein the filtering time effects a damping of load reversal and jolt between the driver's wish and internal motor speed ratio. With 6 is designated a second filter which communicates with the transmission electronics and by which the dynamics of the driver's desired torque is controlled in certain situations wherein the filtering time of the second filter 6 is communicated by the transmission control 20, for ex., via the CAN bus, to the engine control 24, and is further processed by the latter.

The output signal of the filter 2 is designated with S16 and the output signal of the filter 1 with S6. These two jointly passed signals are fed as signal S17 to a third microprocessor 3 which receives additional signals such as S7 as torque-limiting signal to protect the transmission, S8 as torque request signal to limit the wheel slip, S9 as torque request signal to control the dynamic vehicle stability and S10 as added torque-limiting signal to protect the engine.

The output signal S11 of the third microprocessor 3, together with a torque-limiting signal S12 advantageously is transmitted as CAN signal by the transmission electronics, is fed to a fourth microprocessor 4 which after processing said signals produces control signals S13 for the throttle valve angle, S14 for the firing angle and S15 for the injection pulse width.

The embodiment in FIG. 1 shows the selection of the filtering time according to the maximum method, i.e. the respective longer filtering time of 5 and 6, is subsequently processed as signal 17 in the microprocessor 3.

Figure 2:
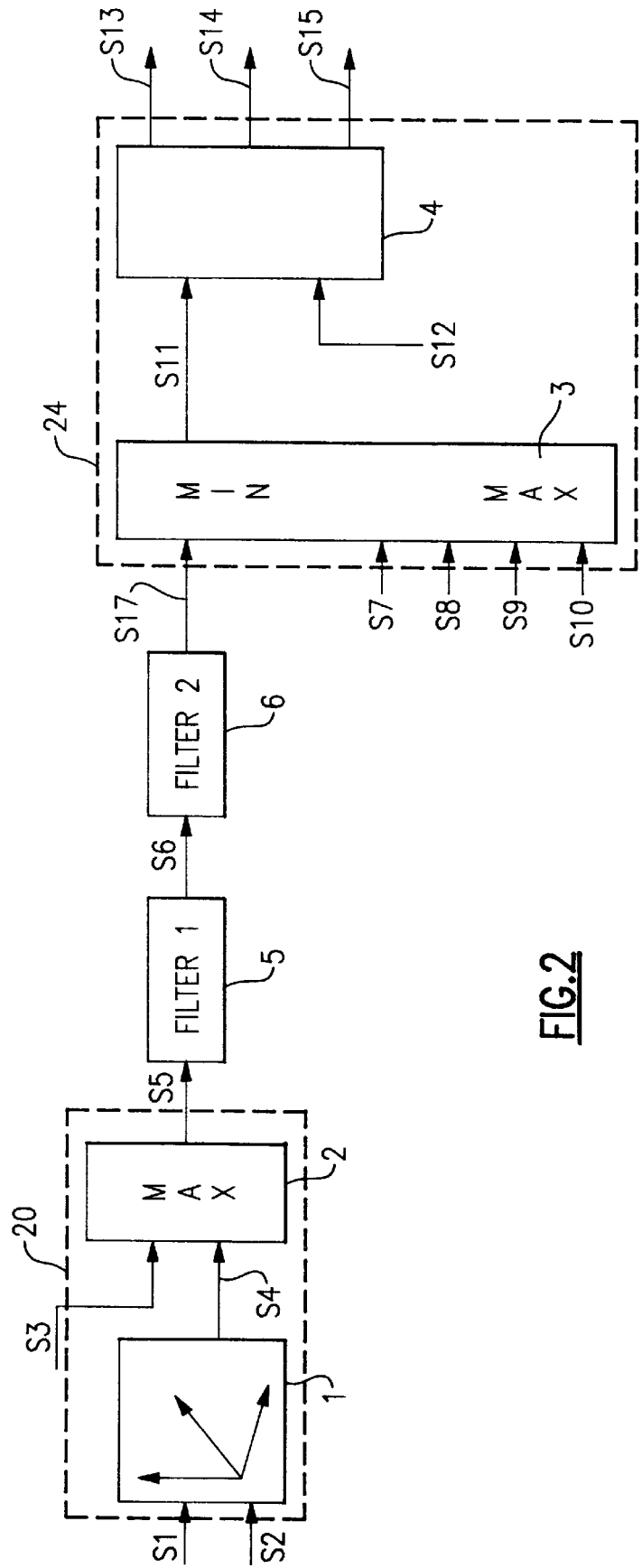
FIG. 2 is a gear shift circuit in which the engine control selects the filtering time according to the sequential method.

In FIG. 2 is shown, on the other hand, an embodiment in which the engine control 24 selects the filtering time according to the sequential method, i.e. to the filtering time of 5 is added the filtering time of 6 and then subsequently processed in the microprocessor 3.

Essential for achieving the purpose, according to the invention, is in both embodiments the control of the dynamics of the driver's desired torque and thus the increase of the comfort by the transmission control 20 in the sense that the filtering time of the second filter 6 is calculated by the transmission control 20 with the aid of transmission specific parameters and be fed via a CAN bus to the engine control 24 and subsequently processed thereby.

REFERENCE NUMERALS

1–4 microprocessors
5 filter
6 filter
s1–s17 signals

What is claimed is:

1. A method of improving driving comfort for a motor vehicle by dynamic control of a desired torque, the method comprising the steps of:

measuring an accelerator pedal position and a rotational speed of an internal combustion engine according to an actual driving state;

feeding the accelerator position and engine speed as a set of input signals to a first microprocessor of a transmission control for developing a first transmission control signal;

providing the first transmission control signal together with a manually adjustable torque request to a second microprocessor for developing an transmission control output signal;

filtering the transmission control output signal through a first filter and a second filter to obtain a filtering time output signal;

softening a jolt produced during a load reversal by damping a difference between an internal engine speed ratio and a torque request according to the filtering time output signal;

inputting the filtering time output signal together with torque-limiting signals originating from the transmission control to a third microprocessor of an engine control for obtaining a first engine control signal; and forwarding the engine control signal from the third microprocessor together with additional torque-limiting signals from the transmission control to a fourth microprocessor in the engine control to obtain engine output control signals for controlling a throttle valve angle, a firing angle and an injection pulse width for managing the dynamics of the torque request and improving the driving comfort of the vehicle.

2. The method according to claim 1, further comprising the step of obtaining a first filtering time output signal from the first filter and obtaining a second filtering time output signal from the second filter; and selecting a longer of the respective first and second filtering times output signals for damping the difference between the internal motor speed ratio and the torque request.

3. The method according to claim 1, further comprising the step of obtaining a first filtering time output signal from the first filter, obtaining a second filtering time output signal from the second filter; and combining the first and second filtering time output signals to obtain the filtering time output signal (S17) for damping the difference between the internal motor speed ratio and the torque request.

4. The method according to claim 1, further comprising the step of supplying to the second filter a signal depending from at least one of the following parameters of: the engine rotational speed, an engine torque, the accelerator pedal position, a throttle valve position, a vehicle speed, the transmission speed ratio, a transmission oil temperature having gradients and variables derived therefrom, a selector lever position, and a gear shift program/driving strategy.

5. The method according to claim 1, further comprising the step of:

processing via the transmission s control, in the second filter, an operating-point dependent flow rate/pressure balance of a variator of a CVT transmission to control the torque request by a driver.

6. The method according to claim 1, further comprising the step of using at least one microprocessor for the transmission control.

* * * * *